United States Patent [19]

Mobley

[11] Patent Number: 4,477,650
[45] Date of Patent: Oct. 16, 1984

[54] PROCESS FOR POLYPHENYLENE OXIDE PREPARATION INCLUDING CATALYST PRE-MIXING

[75] Inventor: David P. Mobley, Schenectady, N.Y.

[73] Assignee: General Electric Company, Schenectady, N.Y.

[21] Appl. No.: 479,057

[22] Filed: Mar. 25, 1983

[51] Int. Cl.³ .................................................. C08G 65/44
[52] U.S. Cl. .................................... 528/215; 528/212; 528/214; 528/216; 528/217
[58] Field of Search .................... 528/212, 214–217

[56] References Cited

U.S. PATENT DOCUMENTS

| | | | |
|---|---|---|---|
| 3,306,874 | 2/1967 | Hay | 260/47 |
| 3,306,875 | 2/1967 | Hay | 260/47 |
| 3,914,266 | 10/1975 | Hay | 260/438.1 |
| 3,988,297 | 10/1976 | Bennett et al. | 260/47 |
| 4,028,341 | 6/1977 | Hay | 528/215 |
| 4,028,341 | 6/1977 | Hay | 260/47 |
| 4,042,564 | 8/1977 | Bennett, Jr. et al. | 528/215 |
| 4,054,553 | 10/1977 | Olander | 260/47 |
| 4,059,568 | 11/1977 | Cooper | 528/215 |
| 4,196,278 | 4/1980 | Bennett, Jr. et al. | 528/215 |
| 4,211,857 | 7/1980 | Sugio et al. | 528/215 |
| 4,385,167 | 5/1983 | Floryan | 528/215 |

FOREIGN PATENT DOCUMENTS

| | | |
|---|---|---|
| 192278 | 8/1981 | Czechoslovakia . |
| 8021798 | 5/1973 | Japan . |
| 48-45600 | 6/1973 | Japan . |
| 49-08597 | 1/1974 | Japan . |

*Primary Examiner*—Lester L. Lee
*Attorney, Agent, or Firm*—William H. Pittman; James C. Davis, Jr.; James Magee, Jr.

[57] ABSTRACT

The preparation of polyphenylene oxides by oxidative coupling of monohydroxy aromatic compounds in the presence of a copper-halide-amine catalyst is improved by initially preparing a homogeneous mixture by blending said monohydroxy aromatic compound and the catalyst reagents in the absence of oxygen, and subsequently contacting said mixture with oxygen to produce said polyphenylene oxide. The pre-mixing step enables the preparation of a catalyst of high activity and long life. The improved process is particularly useful for the continuous preparation of polyphenylene oxides.

15 Claims, 2 Drawing Figures

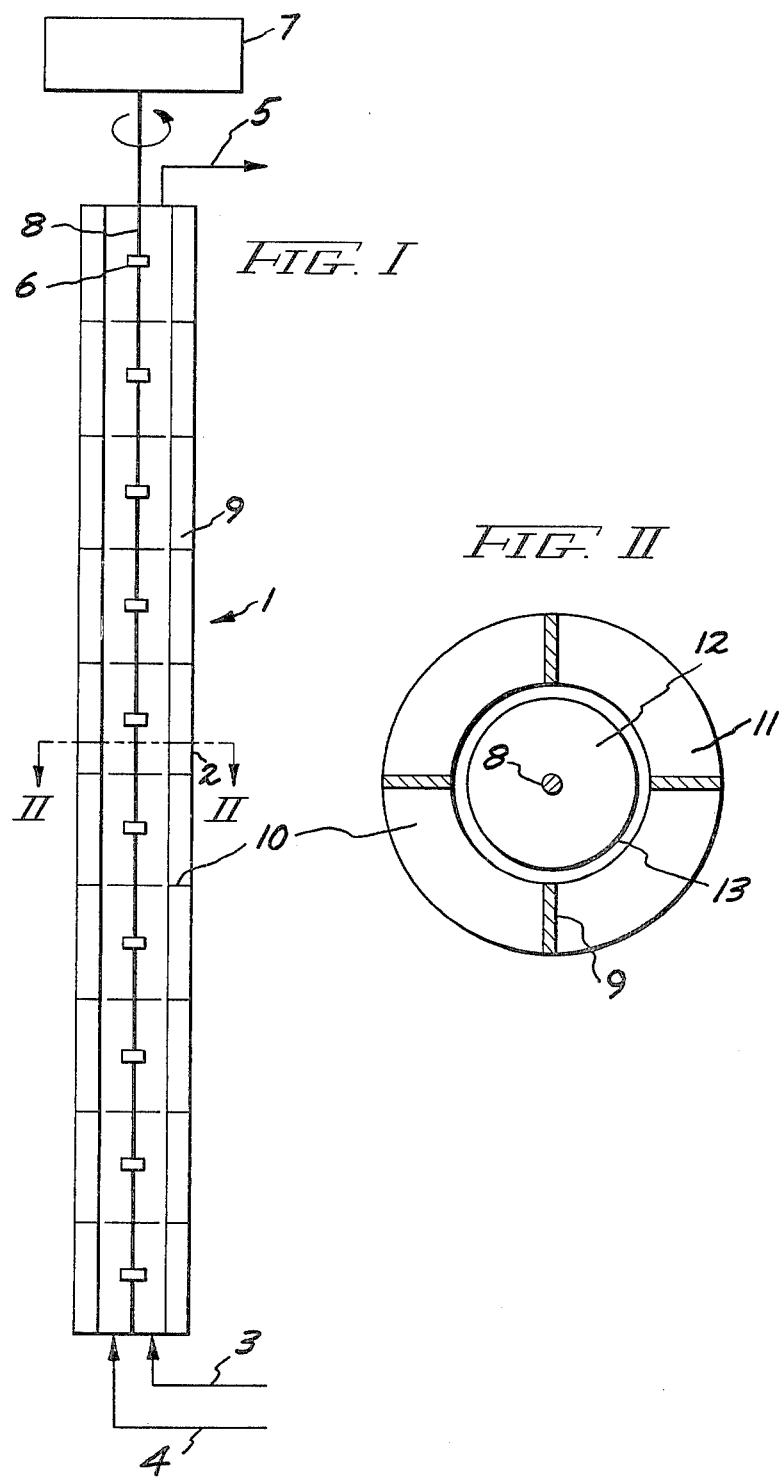

PROCESS FOR POLYPHENYLENE OXIDE PREPARATION INCLUDING CATALYST PRE-MIXING

This invention relates to the preparation of polyphenylene oxides, and more particularly to an oxidative coupling process for such preparation which is adaptable to continuous operation. In its broadest sense, the invention is an improvement in an oxidative coupling process for preparing a polyphenylene oxide by the reaction of oxygen with at least one monohydroxy aromatic compound in the presence of a copper-halide-amine catalyst, said improvement comprising initially preparing a homogenous mixture by blending said monohydroxy aromatic compound and the catalyst reagents in the absence of oxygen, and subsequently contacting said mixture with oxygen to produce said polyphenylene oxide.

For the most part, the present processes for the preparation of polyphenylene oxides are batch processes. Reference is made, for example, to the following U.S. Pat. Nos:

3,306,875 (hereinafter '875)
3,914,266 (hereinafter '266)
4,028,341 (hereinafter '341).

A problem associated with batch operation is variation from batch to batch in product quality. In addition, continuous processes frequently offer lower capital and operating costs per unit of production than batch processes, especially in large-scale production. Therefore, it is of continuing interest to develop continuous processes for polyphenylene oxide production.

It is frequently found that continuous polyphenylene oxide processes are relatively slow unless optimum catalyst activity is achieved and maintained. Accordingly, there is considerable interest in optimizing the initial activity of the catalyst species and in maintaining high activity and minimizing catalyst deactivation during the entire polymerization process. This is more of a challenge in a continuous system than in a batch system, since the conditions in a continuous system are frequently not conductive to the efficient interaction of catalyst ingredients to form active catalyst.

A principal object of the present invention, therefore, is to provide a continuous process for the preparation of polyphenylene oxides.

A further object is to provide such a process which is conveniently adapted to commercial production.

Still another object is to promote high catalyst activity over a long period of time, making possible continuous polymerization with the use of a minimum amount of catalyst.

Other objects will in part be obvious and will in part appear hereinafter.

The present invention is based on the discovery that catalyst activity is maximized if the catalyst is initially prepared in the presence of a high concentration of monohydroxy aromatic compound under non-polymerization conditions. Therefore, the invention includes the steps of catalyst preparation by blending (hereinafter "pre-mixing") the catalyst ingredients with the monohydroxy aromatic compound in the absence of oxygen, followed by catalyst use under oxidative coupling conditions (i.e., in the presence of oxygen).

Typical monohydroxy aromatic compounds (hereinafter sometimes referred to as "phenols" for brevity) useful in the process of this invention are those having the formula

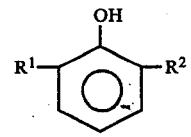

wherein $R^1$ is a lower primary alkyl group and $R^2$ is a lower primary or secondary alkyl group, the word "lower" meaning that it contains up to 7 carbon atoms. Examples of lower primary alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of lower secondary alkyl groups are isopropyl, sec-butyl and 2-pentyl. Preferably, $R^1$ and $R^2$ are straight chain rather than branched. Since the polyphenylene oxides in which $R^1$ and $R^2$ are other than methyl generally have no more desirable properties than those in which $R^1$ and $R^2$ are both methyl, and since 2,6-xylenol is the most readily available and cheapest 2,6-dialkylphenol, its use is preferred. The polyphenylene oxide obtained is then poly(2,6-dimethyl-1,4-phenylene oxide). Other suitable phenols are disclosed in the '875 and '341 patents and U.S. Pat. No. 3,306,874 (hereinafter '874), the disclosures of which are incorporated by reference herein.

The catalyst used in the process of this invention is a combination of copper (i.e., cuprous or cupric) ions, halide (i.e., chloride, bromide or iodide) ions and at least one amine. The source of copper ion can be any of the cupric or cuprous salts disclosed in the '874 and '875 patents. See, for example, '874 from column 3, line 62 to column 4, line 61. The halide ion is preferably bromide, and its source can be any of those disclosed in the '341 patent; particular reference is made to column 8, line 61, to column 9, line 53. For example, it can be an inorganic bromide (except for ammonium bromide, because the ammonium ion can also form a strong complex with copper ions) and can include bromine and hydrogen bromide. Also useful are organic bromine compounds which, under reaction conditions, produce bromide ions. An example thereof is 4-bromo-2,6-xylenol. The only basic requirement is that the bromine compound be capable of supplying a form of bromide ion which is soluble in the reaction mixture. If the bromine compound itself is insoluble, it can still be satisfactory if it forms soluble complexes with the amine constituents of the catalyst or produces a soluble product under oxidative coupling conditions. When metal bromides other than the copper bromides are used, the particular metal used is merely one of choice. Since some of these materials (e.g., cobalt) form complexes with amines, suitable adjustments in the amount of amine used may sometimes be necessary. Because of low cost and ready availability, when using a metal bromide often the alkali or alkaline earth metal bromides are used, e.g., sodium bromide. Since hydrogen bromide will react with amines to form an amine hydrobromide salt and bromine will brominate the phenol and simultaneously produce hydrogen bromide, again adjustments in the amount of amine may be necessary in such situations.

The currently preferred bromine source is HBr, which may conveniently be combined with the copper source as a solution of cuprous oxide in aqueous hydrobromic acid.

The amine constituents of the catalyst mixture may be any of those disclosed in the '874, '875, '266 and '341 patents. Preferably, however, the amines comprise at least one secondary alkylene diamine and at least one tertiary monoamine.

The secondary alkylene diamine may be selected from those disclosed in the '341 patent, especially from column 6, line 44, to column 8, line 11. It generally has the formula

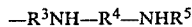

wherein each of $R^3$ and $R^5$ is a secondary or tertiary alkyl group and $R^4$ is a divalent hydrocarbon group, and wherein at least two and no more than three carbon atoms separate the two amine nitrogen atoms and the carbon atoms to which the amino nitrogen are attached are aliphatic. Preferably, there are only two carbon atoms separating the two amino nitrogens. The two or three carbon atoms separating the amino nitrogens can be either acyclic or cyclic carbon atoms. Typical examples of $R^4$ include ethylene, 1,2- and 1,3-propylene, 1,2-, 1,3- and 2,3-butylene, the various pentylene isomers having from two or three carbon atoms separating the two free valences, phenylethylene, tolylethylene, 2-phenyl-1,2-propylene, cyclohexylethylene, 1,2- or 1,3-cyclohexylene, 1,2-cyclopropylene, 1,2-cyclobutylene and 1,2-cyclopentylene.

Typical examples of $R^3$ and $R^5$ include isopropyl and tertiary alkyl groups. The substituents on the α-carbon atoms can be straight or branched chain alkyl, cycloalkyl, aryl or alkaryl. Typical examples of groups $R^3$ and $R^5$ include those set forth in the '341 patent, column 8, lines 2-11, e.g., t-butyl, 2-methyl-2-butyl, etc. The currently preferred secondary alkylene diamine is N,N'-di-t-butylethylenediamine.

The tertiary monoamine can be selected from those disclosed in the '341 patents; specific reference should be made to column 8, lines 12-33. It can be a heterocyclic amine or a trialkylamine characterized by having the amine nitrogen attached to at least two groups which have a small cross-sectional area. In the case of trialkylamine, it is preferred that at least two of the alkyl groups be methyl with the third being a $C_{1-8}$ primary or $C_{3-8}$ secondary alkyl, and it is more preferred that the third substituent have no more than four carbon atoms. The currently preferred tertiary monoamine is dimethyl-n-butylamine.

At least one secondary monoamine as disclosed in the '874 patent from column 4, line 62 to column 6, line 13, may optionally also be used. In addition to functioning as part of the catalyst and increasing the activity thereof, the secondary amine frequently increases the impact strength of the polymer, particularly in blends with other polymers such as polystyrenes. It is believed that the increase in impact strength is achieved by a crosslinking reaction similar to that disclosed in U.S. Pat. No. 4,054,553 at column 6, lines 28-60. The currently preferred secondary monoamines are dimethylamine and di-n-butylamine. The use of dimethylamine for this purpose in polyphenylene oxide preparation is disclosed and claimed in copending application Ser. No. 501,477, filed June 6, 1983.

A phase transfer catalyst may also optionally be used in the reaction system as a reaction rate promoter. Useful phase transfer catalysts are disclosed in U.S. Pat. No. 3,988,297, hereby incorporated by reference; specific reference is made to column 2, lines 11-26, and column 3, lines 1-23. The currently preferred phase transfer catalyst is Adogen 464, which is a methyltrialkylammonium chloride wherein the alkyl groups have from 8 to 10 carbon atoms.

One or more solvents may be present in the reaction system. Typical solvents are disclosed in the '874, '875 and '341 patents. The function of the solvent is to provide a liquid phase in which both the phenol and catalyst are soluble. It need not act as a solvent for the reaction products. Illustrative solvents are toluene and benzene; other inexpensive and readily available commercial solvents may also be used.

According to the present invention, the above-described ingredients are pre-mixed in operative proportions (as described hereinafter) in an oxygen-free atmosphere; i.e., an inert atmosphere. The pre-mixing typically takes place at a temperature within the range of about 20°-40° C., preferably at room temperature (i.e., about 25° C.), in the presence of an inert gas such as nitrogen or helium. It may be effected by agitation for a period of time sufficient to achieve a homogenous solution, typically from about 10 minutes to about 2 hours and preferably about 15-30 minutes.

Pre-mixing may be effected in a batch or continuous operation. When it is a batch operation, the copper and halide ions should be added last in order that they will be solubilized by complex formation with the amines. It is within the scope of the invention to pre-mix and store a large catalyst batch, using it as required in either batch or continuous polymerization processes. In a continuous pre-mixing operation, no special addition order is necessary since each catalyst ingredient is always present in the pre-mix vessel. Under these conditions, a catalyst species is formed which is highly active under oxidative coupling conditions and which retains high activity for a relatively long period of time, thus continuing to promote effective polymerization for the duration of the polymerization process, whether batch or continuous. The proportions of ingredients in the pre-mixture are generally the same as in the oxidative coupling reaction mixtures of the prior art. The phenol is generally used in an amount of about 5-60% of total solution weight, preferably 10-40% and most preferably 15-25%. Products which have a commercially desirable molecular weight are most easily obtained in the area of 20% phenol.

Copper ratios are generally 1 mole of copper to about 100-1500 and preferably 250-1000 moles of total phenol used. The molar ratio of halide (preferably bromide) to copper ions in the catalyst affects catalyst activity, and a ratio of at least about 3.5 moles halide to 1 mole copper is preferred. The upper limit of this ratio is not critical and molar ratios as high as 6 or 12 or more can be used. Currently preferred molar ratios are 4-6 moles Br per mole Cu.

The secondary alkylene diamine is generally used in an amount of about 0.4-3 moles per mole of copper and the tertiary monoamine in an amount of about 10-100 moles, and preferably 20-60 moles, per mole of copper. The secondary monoamine, when present, is generally used in an amount up to 3 mole percent based on total phenol used, with 0.5-2 mole percent being preferred. The phase transfer agent, when present, is typically used in an amount of up to 0.8%, preferably 0.1-0.2%, by weight based on total phenol used.

It is within the scope of the invention to introduce all of each reagent at the beginning of the system, or to introduce various reagents incrementally at various points in the system. For example, the entire amount of phenol may be introduced into the pre-mixing stage or a portion thereof (typically about 20-50% of the total amount) may be added at a later stage, most often into the first reaction vessel. The same is true of the catalyst ingredients, although replenishment of catalyst in major amount at a later stage is not as important in the process of this invention as in prior art processes. The catalyst ingredients most usually added incrementally are copper, bromide and secondary alkylene diamine. If incremental addition is employed, the following weight percentage amounts of these reagents are typically added in later stages:

Copper—5-25%, preferably 20-25%
Bromide—10-30%, preferably 25-30%
Diamine—20-50%, preferably 30-50%.

Following formation of the catalyst species in the pre-mixture, polymerization is initiated. In a batch process, this may be done be merely contacting the pre-mixture with oxygen. For example, the inert gas feed may be replaced by an oxygen feed or, preferably, oxygen may be sparged into the mixture. The invention has its major advantages, however, in connection with continuous polyphenylene oxide production, and when a continuous process is used the pre-mixture is normally prepared in a continuous-flow stirred tank vessel and then transferred to another vessel for polymerization. Any suitable continuous reaction system may be used; for example, the pre-mixture may be transferred to the first of a plurality of continuous-flow stirred tank reactors (CSTR's), or a reactor characterized by limited back-mixing may be employed. Limited back-mixing reaction systems are typified by continuous-flow tubular reactors, especially those in which baffles, packing, multiple reaction zones or the like are present to minimize flow in the reverse direction. Another alternative is to employ one or more CSTR's in combination with a continuous-flow tubular reactor.

A number of systems possibly adaptable to continuous production are known in the art; reference is made to the '874 patent and to the following, all of which are incorporated by reference herein:

Czechoslovakia Pat. No. 192,278
Japanese Kokai No. 73/45600
Japanese Kokai No. 74/08597
Japanese Kokai No. 80/21798 (published application No. 80/40613).

Reference is also made to copending, commonly assigned application Ser. No. 479,066, filed Mar. 25, 1983. An illustrative reactor of this type is shown in the drawings, in which FIG. I is a schematic diagram of a multi-zone limited back-mixing reactor and FIG. II is a cross-sectional view of one stage of said reactor along the line II—II of FIG. I.

Reactor 1 as shown in FIG. I has ten zones, one of which is designated as 2 and shown in cross-section in FIG. II. Oxygen is sparged via line 3, reaction mixture is introduced via line 4 and product is withdrawn via line 5. Centered in each zone is a turbine agitator 6; all such agitators are driven by motor 7 via shaft 8. Each zone is provided with four equally spaced vertical baffles 9 and with a horizontal baffle 10, the latter comprising an outer section 11 attached to the inner wall of reactor 1 and an inner section 12 attached to shaft 8. Between them, outer section 11 and inner section 12 define an annular area 13 of limited back-mixing. Usually, annular area 13 comprises about 2-15%, most often about 4-8%, of the inner cross-sectional area of reactor 1.

The polyphenylene oxides produced by the process of this invention typically have weight average molecular weights of about 5,000 to 75,000, corresponding to intrinsic viscosities of about 0.1-0.75 dl./g. as determined in chloroform at 25° C. the molecular weight is preferably above about 50,000. The percent product in the final reaction solution is obsviously determined by the amount of phenol introduced, since essentially all of said phenol is converted to polymer per the present invention. The product polymer may be isolated from solution by conventional methods such as precipitation by addition of a non-solvent for the polymer.

The invention is illustrated by the following examples. All percentages are by weight of total solution, and all mole amounts are per 1000 moles of 2,6-xylenol in the original feed solution. The following abbreviations are used:
DBEDA—N,N'-di-t-butylethylenediamine
DMBA—dimethyl-n-butylamine
DBA—di-n-butylamine.
Intrinsic viscosities were measured in chloroform at 25° C.

EXAMPLE 1

The apparatus consisted of a pre-mix vessel, a single CSTR, a centrifuge and a multi-zone reactor in series. The CSTR was an upright cylindrical tank 14 inches in diameter, agitated with a 5-inch diameter turbine agitator with 6 blades. The tank had a 10-gallon working volume and the agitator speed was 400 rpm. The CSTR was equipped with vertical baffles to prevent vortexing. Conventional internal cooling coils and external cooling jackets were used to remove the heat of reaction. The CSTR was maintained at 30° C. and ambient pressure with oxygen being introduced into the bottom thereof.

The multi-zone reactor was as shown in FIG. I. It had an internal diameter of 3 inches, was 30 inches long and contained 10 identical zones. With reference to FIG. II, inner section 12 had a diameter of 1.5 inches and annular area 13 had a width of 0.125 inch. The diameter of each turbine agitator 6 was 1.5 inches; each such agitator had 6 flat blades mounted on shaft 8 and was located midway between the top and bottom of its zone. Four vertical baffles 9, each 0.25 inch wide, were equally spaced around the circumference of the vessel. The turbines were rotated at 550 rpm. and the multi-zone reactor was operated at slightly above ambient pressure (typically 0-5 psig.). The multi-zone reactor was cooled or heated as necessary by means of a water jacket.

A pre-mixture in toluene as solvent was prepared by mixing the ingredients thereof in the pre-mix vessel under nitrogen for 15 minutes. Said pre-mixture contained 22% 2,6-xylenol, 0.022% Adogen 464 and the following proportions of catalyst reagents:

| Reagent | Moles |
|---------|-------|
| DBEDA | 1.1 |
| DMBA | 44 |
| DBA | 9.4 |
| Cu | 1.7 |

| Reagent | Moles |
|---------|-------|
| HBr | 6.9 |

Copper and bromide were provided in the form of a Cu$_2$O solution in 48% aqueous HBr.

The pre-mixture was continuously pumped as feed solution into the CSTR and liquid was continuously withdrawn such that a constant liquid volume was maintained and the average liquid residence time in the CSTR was 33 minutes. Oxygen was fed into the CSTR at a rate of 60 SCFH.

The feed from the CSTR was centrifuged to remove the water of reaction. To the organic solution, under nitrogen, were added the following additional proportions of reagents:

| Reagent | Moles |
|---------|-------|
| DBEDA | 1.0 |
| Cu | 0.50 |
| HBr | 2.7 |

The resulting solution was continuously fed through the multi-zone reactor at a rate such that the average liquid residence time therein was 20 minutes. Oxygen was fed to the multi-zone reactor at a rate of 1.5 SCFH. The multi-zone reactor was maintained at an average temperature of 40° C. with about ±3° C. temperature variation along the length of the reactor.

The polyphenylene oxide product was isolated by diluting the solution thereof with one volume of toluene and then with approximately five volumes of methanol, filtering and drying in conventional manner. It had an intrinsic viscosity of 0.58 dl./g.

EXAMPLE 2

A pre-mixture in toluene as solvent was prepared containing 20% 2,6-xylenol, 0.03% Adogen 464 and the following proportions of catalyst reagents, the copper and bromide being provided as a solution of Cu$_2$O in 48% aqueous HBr:

| Reagent | Mole |
|---------|------|
| DBEDA | 3.3 |
| DMBA | 67 |
| DBA | 14.2 |
| Cu | 1.7 |
| HBr | 8.9 |

The pre-mixture was agitated under nitrogen for 15 minutes and was then continuously pumped as feed solution to the multi-zone reactor of Example 1 at the rate of 63 ml. per minute, resulting in a liquid residence time in the reactor of 44 minutes. Oxygen was fed to the reactor at a rate of 3.5 SCFH. The temperature in the reactor, after reaching steady state, was 42±2° C. The reactor was operated continuously at steady state for 3.5 hours. The reaction mixture was diluted with one volume of toluene and then with 5 volumes of methanol and the precipitated polyphenylene oxide was filtered and dried. It had an intrinsic viscosity of 0.34 dl./g. at 25° C. in chloroform, corresponding to a weight average molecular weight of 32,000.

What is claimed is:

1. A process for maximizing catalyst activity in the preparation of a polyphenylene oxide by the reaction of oxygen with at least one monohydroxy aromatic compound in the presence of a copper-halide-amine catalyst in which the amine constituents comprise at least one secondary alkylene diamine and at least one tertiary monoamine;

said process comprising initially preparing a homogeneous blend comprising said monohydoxy aromatic compound and the catalyst reagents in an inert atmosphere, said monohydroxy aromatic compound comprising 5–60% by weight of said blend, and subsequently contacting said blend with oxygen to produce said polyphenylene oxide.

2. A process according to claim 1 wherein the halide is bromide.

3. A process according to claim 2 wherein the mixture is prepared at a temperature within the range of about 20°–40° C.

4. A process according to claim 3 wherein the amine constituents of the catalyst additionally include at least one secondary amine in an amount up to 3 mole percent based on said monohydroxy aromatic compound.

5. A process according to claim 4 wherein the secondary alkylene diamine is N,N'-di-t-butylethylenediamine and the tertiary monoamine is dimethyl-n-butylamine.

6. A process according to claim 5 wherein the monohydroxy aromatic compound is 2,6-xylenol.

7. The process according to claim 6 wherein said 2,6-xylenol comprises 15–25% of said blend.

8. a process according to claim 7 which is a continuous process.

9. A process according to claim 2 wherein the mixture also contains a phase transfer catalyst.

10. A process according to claim 9 wherein the mixture is prepared at a temperature within the range of about 20°–40° C.

11. A process according to claim 10 wherein the amine constituents of the catalyst additionally include at least one secondary amine in an amount up to 3 mole percent based on said monohydroxy aromatic compound.

12. A process according to claim 11 wherein the secondary alkylene diamine is N,N'-di-t-butylethylenediamine and the tertiary monoamine is dimethyl-n-butylamine.

13. A process according to claim 12 wherein the monohydroxy aromatic compound is 2,6-xylenol.

14. A process according to claim 13 wherein said 2,6-xylenol comprises 15–25% of said blend.

15. A process according to claim 14 which is a continuous process.

* * * * *